(12) United States Patent
Creusen et al.

(10) Patent No.: US 7,616,276 B2
(45) Date of Patent: Nov. 10, 2009

(54) LIGHT RECYCLING IN A TRANSFLECTIVE LCD

(75) Inventors: Martinus Petrus Creusen, Heerlen (NL); Frans Leenhouts, Brugge (BE); Hendrik Christiaan Maria Hermens, Heerlen (NL)

(73) Assignee: TPO Hong Kong Holding Limited, Shatin, Hong Kong SAR (CN)

( * ) Notice: Subject to any disclaimer, the term of this patent is extended or adjusted under 35 U.S.C. 154(b) by 226 days.

(21) Appl. No.: 10/572,471

(22) PCT Filed: Sep. 15, 2004

(86) PCT No.: PCT/IB2004/051766

§ 371 (c)(1),
(2), (4) Date: Mar. 20, 2006

(87) PCT Pub. No.: WO2005/029168

PCT Pub. Date: Mar. 31, 2005

(65) Prior Publication Data

US 2007/0052884 A1 Mar. 8, 2007

(30) Foreign Application Priority Data

Sep. 23, 2003 (EP) .................................. 03103514

(51) Int. Cl.
*G02F 1/1335* (2006.01)
(52) U.S. Cl. .............................. 349/114; 349/96; 349/98; 349/113; 349/115
(58) Field of Classification Search ................. 349/115, 349/96, 98, 113, 114
See application file for complete search history.

(56) References Cited

U.S. PATENT DOCUMENTS

| | | | | |
|---|---|---|---|---|
| 4,749,261 A * | 6/1988 | McLaughlin et al. | .......... | 349/16 |
| 6,184,955 B1 | 2/2001 | Okumura | | |
| 6,507,380 B1 * | 1/2003 | Iijima | .......... | 349/96 |
| 6,621,543 B2 * | 9/2003 | Moon | .......... | 349/115 |
| 6,644,816 B1 * | 11/2003 | Perra et al. | .......... | 353/119 |
| 7,095,466 B2 * | 8/2006 | Ma | .......... | 349/115 |
| 2002/0036728 A1 | 3/2002 | Okumura | | |
| 2003/0063236 A1 * | 4/2003 | Watson et al. | .......... | 349/96 |
| 2003/0160924 A1 * | 8/2003 | Kashima | .......... | 349/115 |

FOREIGN PATENT DOCUMENTS

| | | |
|---|---|---|
| EP | 0930522 | 7/1999 |
| WO | WO 98/02774 | 1/1998 |
| WO | WO 03/029885 | 4/2003 |

\* cited by examiner

*Primary Examiner*—Michael H Caley
(74) *Attorney, Agent, or Firm*—Liu & Liu

(57) ABSTRACT

The present invention provides for improved brightness and reduced power consumption in transflective displays operating in transmissive mode. The invention is based on the inclusion of a depolarizing means (206) between the transflector (201) and the rear stack polarizer (202). The depolarizer (206) is arranged to selectively depolarize light originating from the backlight (203) and reflected by the transflector (201), without substantially affecting the light that is transmitted through the transflector. Thereby part of the reflected light is transmitted back through the rear stack polarizer (202) and can be recycled in the backlight (203). The invention is applicable to any transflective display having a transflector (201) that changes polarization of light originating from the backlight (203) upon reflection back towards the backlight (202).

16 Claims, 6 Drawing Sheets

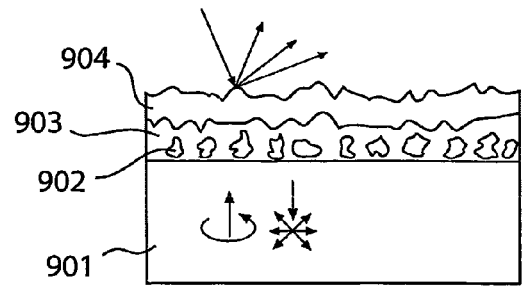
FIG.9
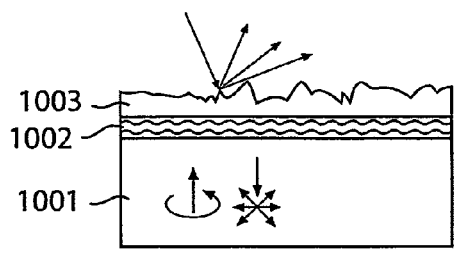
FIG.10
| Cell Concept | Light input | Light transmission | Light recycling | Light absorption |
|---|---|---|---|---|
| Reference | 100% | 12.5% | 0% | 87.5% |
| Depolarisation | 100% | 12.5% | 19% | 68.5% |
| DBEF | 100% | 12.5% | 50% | 37.5% |
| DBEF+ Depolarisation | 100% | 12.5% | 69% | 18.5% |
FIG.11

LIGHT RECYCLING IN A TRANSFLECTIVE LCD

FIELD OF THE INVENTION

The present invention relates to a liquid crystal display device, and more specifically to a transflective liquid crystal display device having improved brightness in transmissive mode.

TECHNOLOGICAL BACKGROUND

Transflective liquid crystal displays, in particular transflective active matrix liquid crystal displays (AM-LCD) and color super twisted nematic liquid crystal displays (CSTN-LCD), are commonly used in mobile handheld applications. Such display devices are preferred due to their comparatively low power consumption and their good front-of-screen performance. A transflective liquid crystal display is characterized by its ability to function in a reflective mode enabling reflection of ambient light, as well as in a transmissive mode enabling transmission of light from an auxiliary light source (for example from a backlight). Devices provided with such transflective displays therefore provide acceptable readability under bright as well as dark conditions.

The fundamental principles of transflective displays are well known, for example from the UK patent application 2 101 347. A transflective liquid crystal display thus comprises a display cell having a front substrate and a rear substrate between which a layer of liquid crystal (LC) material is sandwiched. In front of the display cell a front polarizer, or analyzer, and a compensation film is sandwiched.

Furthermore, an optical rear stack comprising a quarter-wave retarder and a linear polarizer element, a diffusing layer, and a light source, is sandwiched in said order behind the rear substrate. Finally, a transflector is arranged between the optical rear stack and the liquid crystal layer.

Transflective displays can operate according to a normally black cell concept or a normally white cell concept. A normally black cell concept provides black images in case no electric field is applied across the liquid crystal and a normally with cell concept provides a bright image in case no electric filed is applied.

When a normally black cell is operating in the reflective mode, and when the cell is inactivated (i.e. no electric field is applied across the LC layer), ambient light entering the front substrate will be absorbed due to the alignment of directors in the liquid crystal layer. A viewer then perceives the display cell as being dark. On the other hand, when the cell is activated (i.e. an electric field is applied between the electrodes), the directors in the liquid crystal are dislocated and instead essentially perpendicular to the front and rear substrates. Thereby a substantial part of the ambient light entering the front substrate is allowed to pass through the cell, reflect at the transflector, and return towards the front substrate. A viewer then perceives the display as being bright.

However, when the ambient light is insufficient for the display to emit a readable picture the light source is turned on activating the transmissive mode. When the transmissive mode is active, randomly polarized light emitted from the light source is linearly polarized by the polarizer and circularly polarized by the quarter-wave retarder (in the optical rear stack), and transmitted through the transflector. In case the liquid crystal cell is inactive, light impinging thereon from the light source is however absorbed in the front liquid crystal. The inactive cell is therefore perceived as dark. On the other hand, when the cell is activated and the liquid crystal molecules are perpendicular to the substrates, a substantial part of the light transmitted through the transflector will exit the cell towards the viewer, setting the display in a bright mode.

The operation of a normally white cell is much the same as for a normally black cell with suitable modifications. Several other arrangements are disclosed in the literature, using configurations similar to the one described above.

Regardless of the particular application at hand, it is very important for the light transmitted towards the liquid crystal layer to have accurate polarization. Light having incorrect polarization will not be affected by the aligned directors in the liquid crystal layer and will thus be transmitted through the liquid crystal regardless of its state (i.e. aligned or disturbed directors). In the following, accurately polarized light transmitted towards the LC layer is regarded as constructive light for the display while light having wrong polarization transmitted towards the LC layer is regarded as destructive light for the display.

In current commercial products, typical reflection/transmission ratios of the transflector vary from 90/10 to 60/40. This means that 60-90% of the light emitted from the auxiliary light source (i.e. the backlight) is not transmitted. This is one of the reasons why typical transmission values (ratios) of transflective liquid crystal displays are very low (2-3%) resulting in low brightness. Separate adjustments and optimizations of the reflective and transmissive mode performances are available, improving the performance but also resulting in manufacturing difficulties and higher production costs. And still, a trade-off still has to be made in the transflective display between transmissive and reflective performance.

Basically, 90 percent of the light incident from the light source is wasted at a 90/10 transflector. This means that the desired output power needs to be increased ten times only to compensate for the poor transmissivity of the transflector. The light source is typically among the most power consuming parts in a transflective display. Increasing the fraction of constructive light transmitted through the transflector, without affecting the reflective properties, is therefore highly desired.

SUMMARY OF THE INVENTION

To this end the present invention provides a transflective display in which an increased fraction of constructive light is transmitted through the transflector.

The invention is based on the insight that the polarization of circularly polarized light originating from the backlight and impinging the transflector is reversed upon reflection at the transflector (i.e. right hand polarization is turned to left hand and vice versa). The reflected light, having reversed circular polarization, is subsequently converted back to linearly polarized light by the quarter wave plate and is transmitted back to the linear polarizer.

The linear polarizer is basically an absorbing light filter, absorbing light components being perpendicular to the optical axis of the polarizer. In case randomly polarized light impinges the linear polarizer, half of the light is transmitted (the light that happens to coincide with the axis of the polarizer) and the other half is absorbed. As it turns out, the retardation-reflection-retardation that the light returning from the transflector experiences turns the linear polarization of the light 90°. The light reflected by the transflector is therefore perpendicular to the transmission axis of the linear polarizer, and is therefore totally absorbed by the polarizer. As a consequence, a major fraction of the light that is initially transmitted through the polarizer is absorbed in the polarizer anyway.

According to the invention, the light returning from the transflector is however depolarized by depolarizing means arranged between the transflector and polarizer. The returning light is thus randomly polarized, and about half of the light is therefore transmitted through the linear polarizer and can be recycled in the backlight arrangement.

Thus, according to one aspect of the invention, a transflective liquid crystal display device is provided which comprises: a liquid crystal layer, a transflector, a polarizing means, and a backlight, sandwiched in said order. The backlight is operative to emit light towards said transflector, and the transflector is transmissive for a first part of said light and non-transmissive for a second part of said light. The display device further comprises a depolarizing means arranged between the transflector and the polarizing means. The depolarizing means is operative to selectively depolarize said second part of light, thereby enabling parts of said second part of light to be transmitted through the polarizing means and to be recycled in the backlight. Parts of the reflected light is thereby transmitted back towards the backlight where it can be recycled and the total amount of light emitted by the backlight can thus be increased. As a consequence, more light can reach the LC layer, and hence the observer, resulting in a brighter display and/or reduced power consumption. As a result, an increased fraction of light can be constructively transmitted through the transflector without affecting the reflective properties of the transflective display.

According to one embodiment, the polarizing means is an absorbing polarizing means. The inclusion of a depolarizing means in such an arrangement thus permits part of the light reflected by the transflector to pass through the polarizer without being absorbed polarizing means. The absorbing polarizing means could, for example, comprise a linear polarizer and circular polarizer (e.g. a quarter wave retarder), as described above.

However, recent discoveries described in the have shown that the linear polarizer and the circular retarder can be exchanged for a layer of twisted nematic polymer. Such layers, accurately tuned, can give the same polarizing effect as the above described combination of a linear polarizer and a retarder. However, there is one fundamental difference. While the linear polarizer acts as an absorbing filter, absorbing light having undesired polarizations, the polymer layer instead reflects light having undesired polarization. This is advantageous since the light originating from the backlight but not transmitted through the polarizer, due to wrong polarization, is reflected back towards the backlight where it can be recycled instead of being absorbed by the polarizer.

Thus, the twisted nematic (TN) layer transmits light that is circularly polarized in one direction and reflects light that is circularly polarized in the opposite direction. This is opposed to the conventionally used linear polarizer which transmits light that is linearly polarized in one direction and absorbs light that is linearly polarized in the opposite direction.

In a transflective display having a twisted nematic layer instead of the conventional linear polarizer and retarder, the light that is transmitted through the polarizer and reflected by the transflector behaves different from the conventional setup. As conventional, the polarization of the light that is reflected by the transflector is reversed upon reflection. However, when impinging the TN layer it is totally reflected instead of being absorbed. But, the reflected light still has reversed polarization. Therefore, when returning to the transflector some of the light is transmitted towards the liquid crystal layer with wrong polarization and thus interfering with the black state. Consequently, in such display units light is not only wasted but the wasted light is actually destroying the black state and thus reducing the contrast of the entire display.

However, in case an inventive depolarizing means is arranged between the transflector and the TN layer, some of the light otherwise transmitted with wrong polarization is instead transmitted through the polarizer and can be recycled by in the backlight. In such implementations the invention thus has the double effect of increasing the amount of light constructively used in the display and reducing the amount of light destructively used interfering with the black state.

In other words, the polarizing means can either comprise an absorbing polarizer, absorbing light having the undesired polarization (such as the linear polarizer), or it can comprise a reflecting polarizer (such as a twisted nematic polymer layer), reflecting the light having wrong polarization. Of course, polarizers being partially absorbing and partially reflecting is also contemplated for the invention.

Thus, according to one embodiment, the polarizing means is a reflecting polarizing means. In such case, the depolarizing means has the effect of increasing the amount of light transmitted back towards the backlight at the expense of the amount of destructive light (having wrong polarization) transmitted through the transflector. In effect, light is redirected from being destructive to being constructive. The reflecting polarizing means could, for example, comprise a twisted nematic polymer layer.

For the proper functioning of the invention, it is important to be able to separate the light that is to be constructively transmitted through the transflector from the remaining light. Hole-in-mirror type transflectors are widely used in transflective displays, and are particularly well suited for the present invention. Selective depolarization of the reflected light is easily provided for in such arrangements using a transflector having depolarizing mirror portions. Light transmitted through the hole portions is then, of course, unaffected by the depolarization, while all the reflected light is effectively depolarized. Therefore, according to one embodiment, the transflector is of a hole-in-mirror type comprising at least one portion that is non-transmissive for light, and at least one portion that is transmissive for light. Using such a transflector the different light portions are easily distinguished, since the light that is to be transmitted is spatially separated from the remaining light. The depolarizing means is preferably arranged with active (depolarizing) areas and passive (non-depolarizing) areas having a pattern that corresponds to the pattern of the transflector.

The transflector can, for example, be a hole-in-mirror type In-Cell Diffuse Reflector (IDR), arranged inside the display cell between the liquid crystal layer and the rear substrate. Such a transflector can be obtained by evaporating a metal onto a roughened surface of the rear substrate facing the liquid crystal layer. If such a transflector is used, small light scattering particles can be contained in the evaporated metal layer in order to give a depolarizing capability to the transflector.

A second alternative is to insert a separate diffuse reflecting layer underneath the hole-in-mirror type transflector and thus facing the backlight. The inserted layer should have the ability to reflect as well as depolarize light incident thereon from the backlight. This could be achieved by depositing a white diffuse reflecting layer on the light source side of the diffusive reflecting layer. An aperture in the diffuse reflective layer can be made with the same mask step as used to open the organic IDR layer(s) thus ensuring alignment of the apertures in the respective layers such that light transmitted through the transflector remains circularly polarized. In case the organic layer(s) is/are not opened, an extra mask step could be used to create this aperture for transmitting the auxiliary light.

Alternatively, the inserted, depolarizing layer could be transmissive. In such case, the reflection is provided by the transflector and the depolarizing means serves only to depolarize the light before and/or after reflection. However, it is important for the inserted depolarizing means to have a transmissive/non-transmissive pattern that substantially coincides with the pattern of the transflector. Otherwise the light that is to be transmitted through the transflector, and thus should be polarized, could be depolarized and would then interfere with the black state of the display. On the other hand, having a depolarizing means that does not cover the entire non-transmissive area of the transflector, so that not all reflected light is depolarized, reduces the effect of the invention. But, of course, it does not result in any transmission of randomly polarized light and thus not any black state interference.

According to one embodiment, the depolarizing means is arranged directly on said transflector, facing the backlight. This is advantageous in that the depolarizing means can be manufactured in the same manufacturing step as the transflector. For example, in case the manufacturing process includes etching, the same mask could be used for the depolarizing means as for the transflector.

According to one embodiment, the depolarizing means comprises a white, diffuse, depolarizing reflective layer and light scattering particles forming an integrated part of said reflective layer. Such an arrangement can be used regardless of the position of the depolarizing means, and provides ease of manufacturing as well as effective depolarization.

Depending on the application, the liquid crystal can be of a twisted nematic (TN) type, a super twisted nematic (STN) type or a non-twisted nematic type.

DETAILED DESCRIPTION OF THE INVENTION

Hereinafter, embodiments of the transflective liquid crystal display device according to the present invention will be described in further detail with reference to the accompanying, exemplifying drawings, on which:

Figure 2:
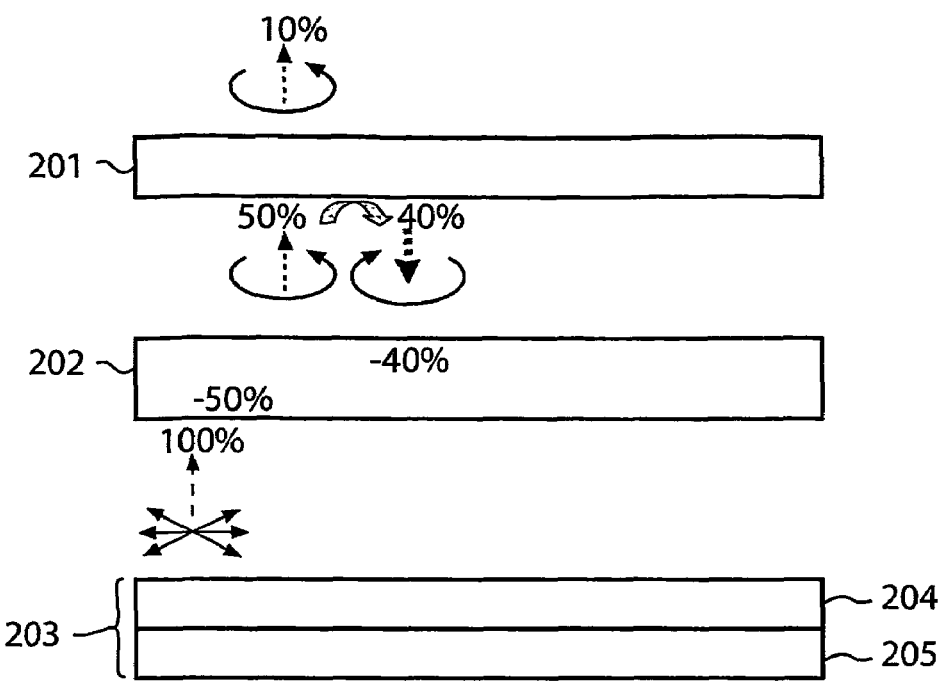
FIG. 2 illustrates percentages of light that are transmitted and absorbed in a prior art display device having an absorbing polarizer.
Figure 3:
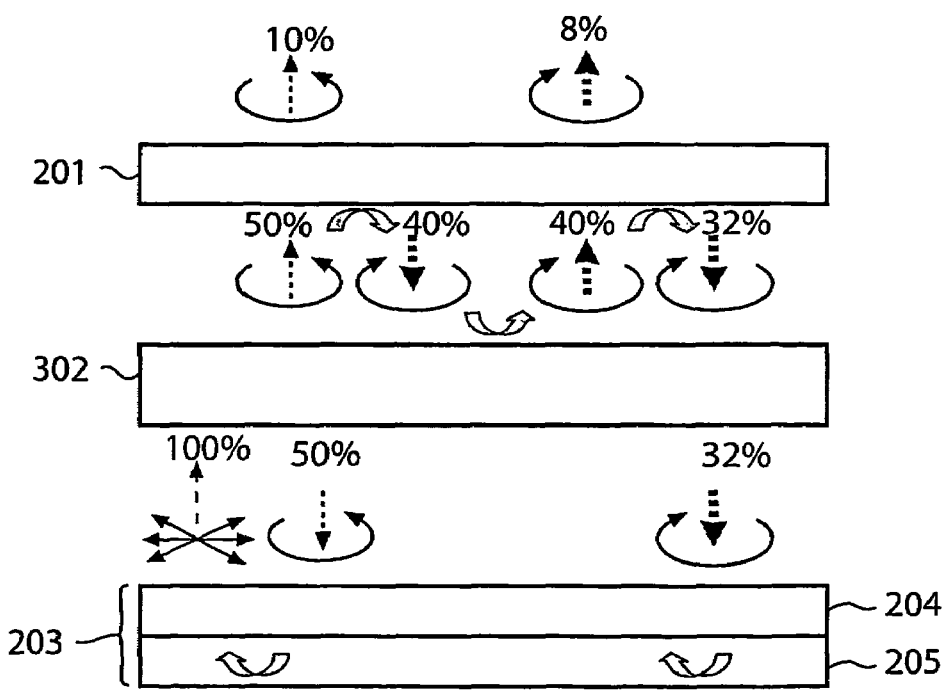
FIG. 3 illustrates percentages of light that are transmitted and reflected in a prior art display device having a reflective polarizer.
Figure 4:
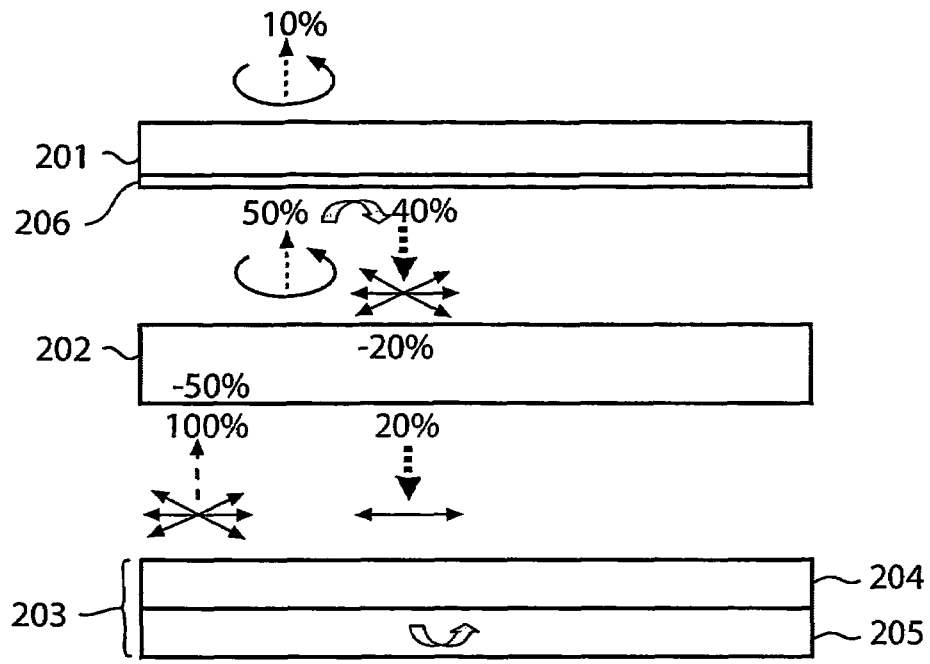
Figure 5:
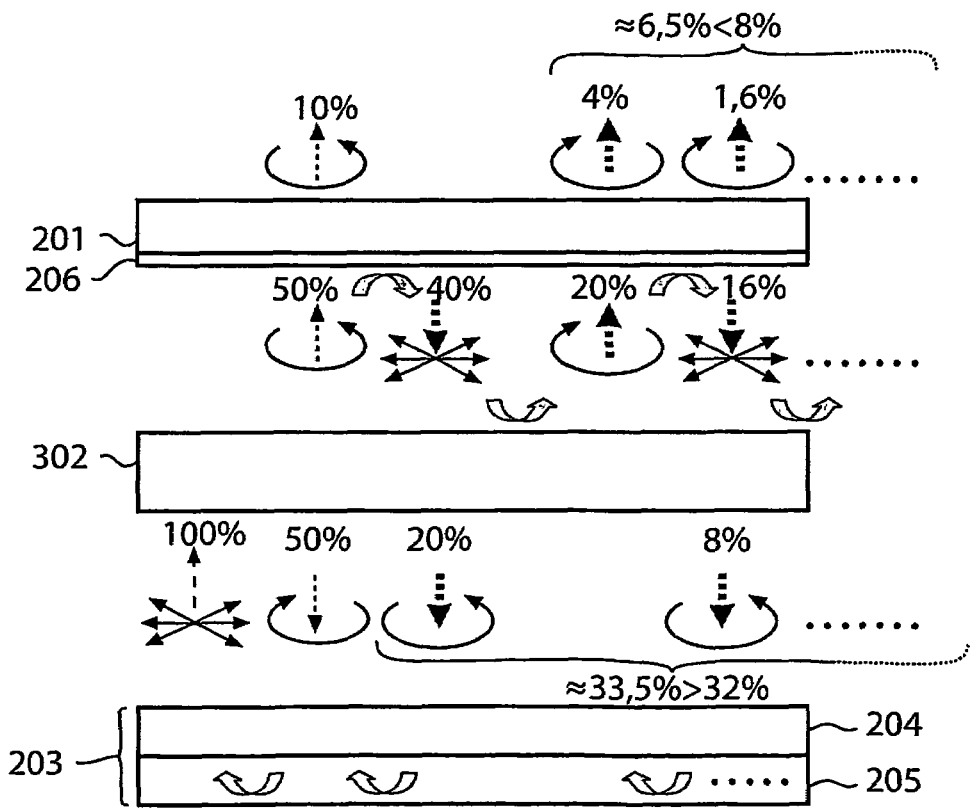

FIGS. 4 and 5 correspond to FIGS. 2 and 3, respectively, but having a depolarizing means in accordance with the present invention.

Figure 6:
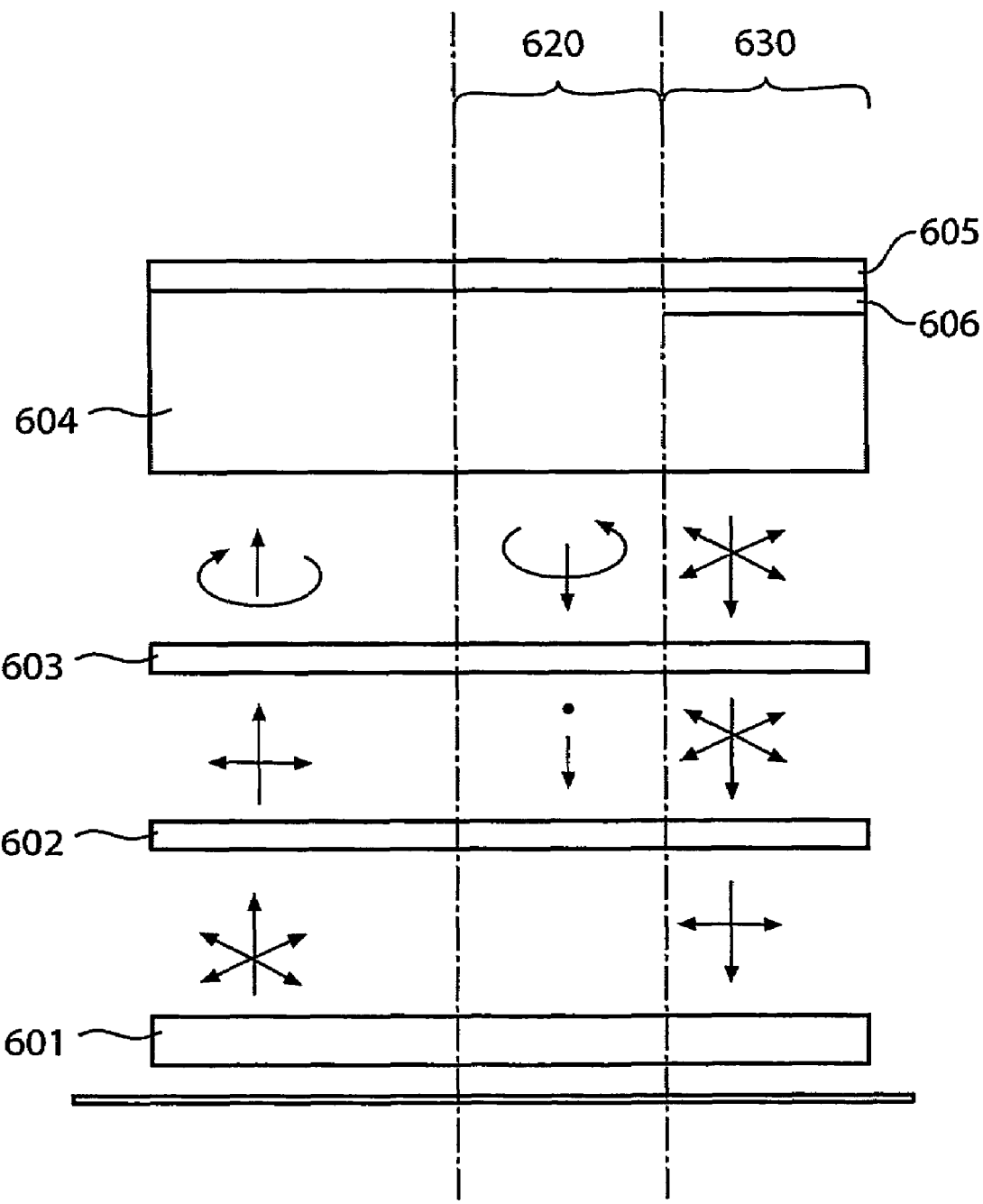
Figure 7:
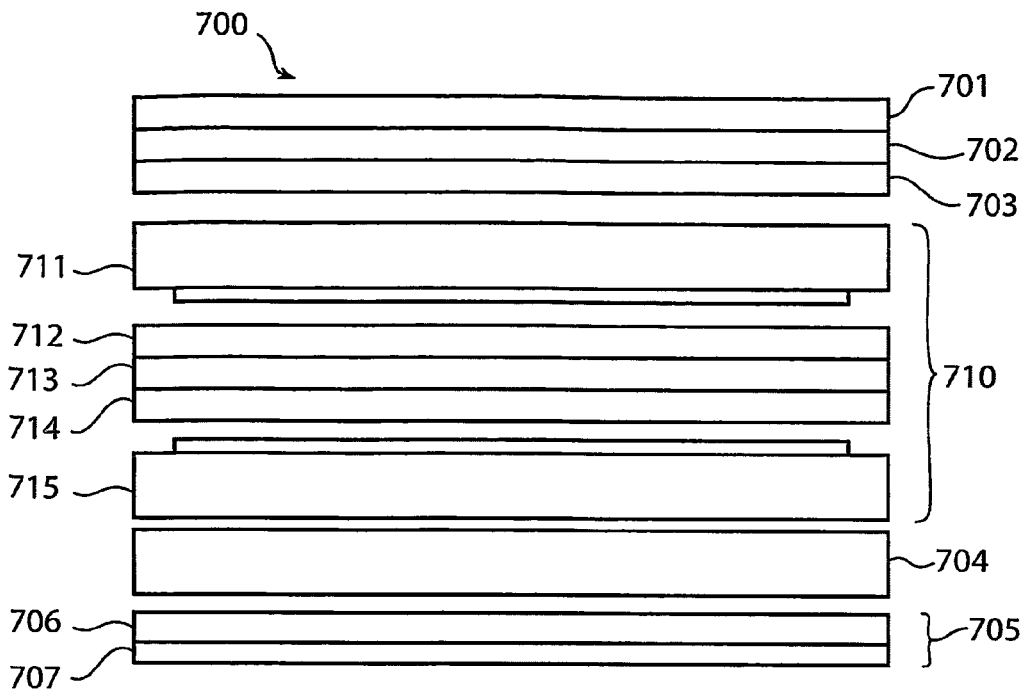
Figure 8:
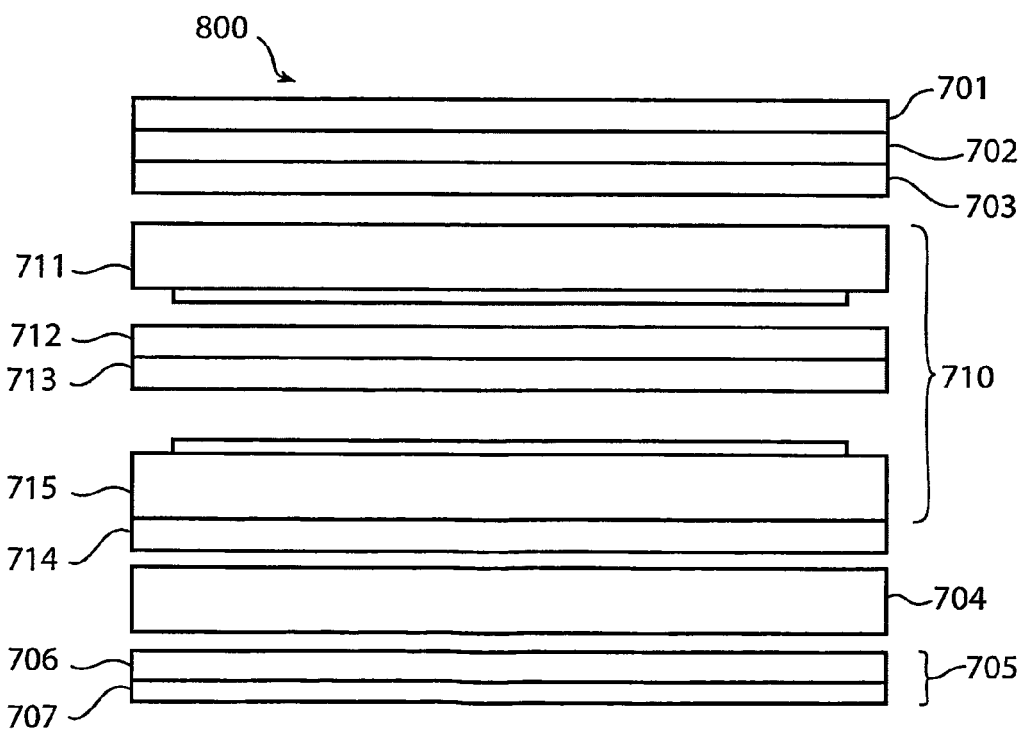

FIG. 6 illustrates light propagating differently in a display unit comprising an absorbing polarizer according to prior art and according to the invention;

FIGS. 7 and 8 illustrates cross sections of different embodiments of the present invention;

FIG. 9 shows one approach for providing depolarizing means involving incorporation of small particles in the roughened area of the transflector;

FIG. 10 shows another approach for providing depolarizing means involving the provision of an additional reflective layer underneath the transflector;

FIG. 11 is a table showing the recycling efficiencies for different cell concepts.

Figure 1:
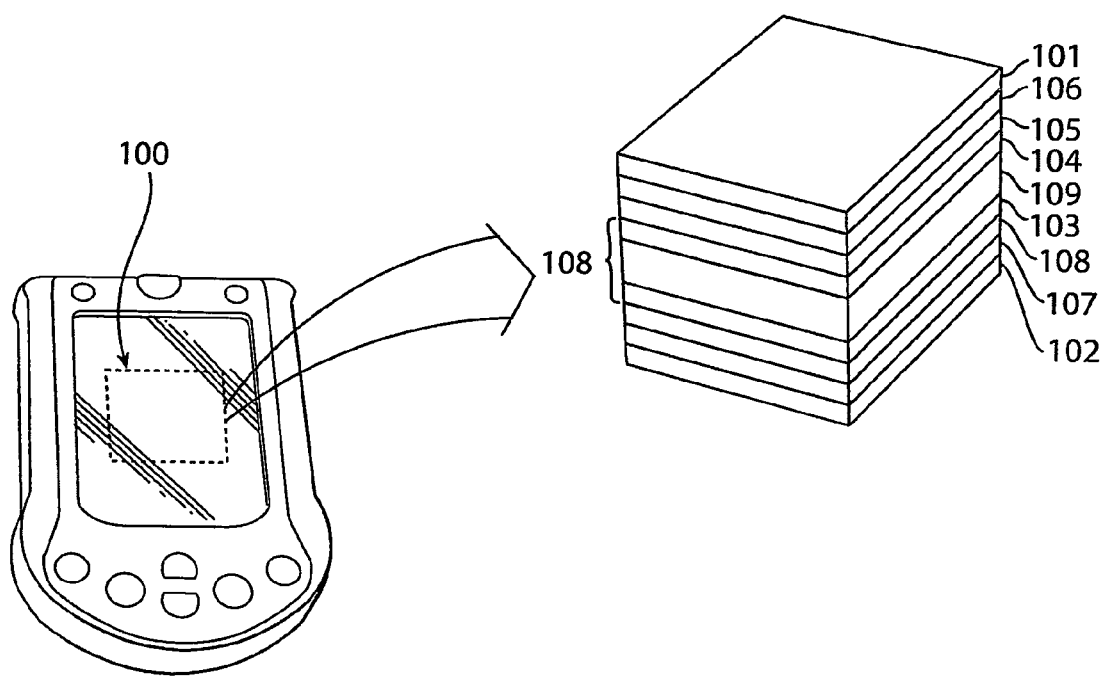
FIG. 1 shows an example of a handheld mobile unit comprising a prior art transflective liquid crystal display unit, and a cross section of the display unit.

First, a more detailed description of the prior art will be provided in order to provide a better understanding of the present invention. Thus, referring to FIG. 1, a handheld device comprising a transflective liquid crystal display device 100 is shown, as well as an enlarged cross section of the transflective liquid crystal display unit. The display unit comprises a liquid crystal cell 108 comprising a front substrate 104 and a rear substrate 103, formed of glass or the like, and a liquid crystal layer 109 sandwiched there between. On the front surface of the front substrate, a front scattering layer 105, a front compensation layer 106 and an analyzer 101 are arranged. On the backside of the rear substrate a transflector 107 is arranged and patterned so that a transmissive part and a reflective part is formed. Furthermore, a twisted nematic polymer layer 105 and a backlight 102 are sandwiched in said order.

In order to illustrate the inventive idea, rear stacks of different transflective displays are shown in FIGS. 2-5. The rear stack comprises a backlight 203, having a diffusing layer 204 and a light guide 205, a polarizing means 202, 302 and a transflector 201. In this particular example the transflector has a transmission/reflection ratio of 20/80. FIGS. 3 and 5 illustrate inventive displays, and thus furthermore comprise a depolarizing means 206. As an illustration, the amount of randomly polarized light that is emitted from the backlight is denoted 100%.

FIG. 2 illustrates a prior art arrangement wherein the polarizing means is of an absorbing type (e.g. a linear polarizer and a quarter wave retarder) Thus, 50% of the randomly polarized light is absorbed by the polarizer 202 and 50% is transmitted through the polarizer 202. Due to the 20/80 ratio, 10% (20% out of 50%) is transmitted through the transflector and 40% (80% out of 50%) is reflected back towards the polarizing means 202. As indicated by the arrows, the circular polarization of the reflected light is reversed. Therefore, all 40% of the reflected light is absorbed by the absorbing polarizing means 202. In total, 90% of the light that is emitted from the backlight is absorbed in absorbing polarizing means 200.

FIG. 3 schematically illustrates a setup using a reflective polarizer (e.g. a twisted nematic polymer layer). Due to the reflectivity of the polarizer, 50% of the light that is emitted from the backlight is reflected back towards the backlight, and 50% is transmitted through the polarizing means 302. Due to the 20/80 ratio, 10% (20% out of 50%) is transmitted through the transflector and 40% (80% out of 50%) is reflected back towards the polarizing means 302. As indicated by the arrows, the circular polarization of the reflected light is reversed. Therefore, all 40% of the reflected light is reflected again by the reflective polarizer 302 towards the transflector 201. This time 8% (20% out of 40%) is transmitted through the transflector 201 and the remaining 32% is reflected back towards the polarizing means 302. The circular polarization is now reversed again (back to the original orientation) and all the remaining light (32%) is therefore transmitted through the polarizing means 302 towards the backlight 203. Thus, two parts of light having opposite polarization directions are transmitted through the transflector resulting in degradation of the black state and therefore decreased contrast in the display device. For this particular example 10% is transmitted with correct polarization and 8% is transmitted with wrong polarization, and is thus destructively wasted.

FIG. 4 illustrates a setup using an absorbing polarizer, as in FIG. 2, but furthermore including a depolarizing means 206. The light (40%) that is reflected by the transflector is therefore randomly polarized when impinging the absorbing polarizer 202, and thus 20% of the light is transmitted (being linearly polarized by the linear polarizer) and the polarizer absorbs only 20%. In total, the polarizer absorbs 70% of the light.

FIG. 5 illustrates a setup using a reflective polarizer 302 and a depolarizing layer 206. As shown, this setup results in the light being reflected multiple times between the transflector and the polarizer. Light impinging the polarizer is randomly polarized, due to the depolarizing means. Thus, each time half of the light is transmitted back towards the backlight and half of the light is reflected towards the transflector having reversed polarization. Since the polarizer only reflects light having wrong polarization, it will in every cycle reflect light having wrong (destructive) polarization only. Each reflection at the transflector result in that 20% of the incident light (having reversed polarization) is transmitted and in that the rest is reflected and depolarized. In this particular example, using a 20/80 transflector, a total of approximately 6.5% of the light be transmitted with reversed polarization and the rest, approximately 33.5% will be transmitted back towards the backlight. The destructive transmission is thus reduced by approximately 1.5 percentage units and the light transmitted towards the backlight is increased with the same amount.

In the above examples, it should be noted that the amounts of light, given in percent, is only suppose to illustrate the fundamental principle of the invention. In practical implementations the amount of transmitted, reflected, and absorbed light will generally depend on the particular materials and compositions used. In effect, the amount of transmitted light will not be as high as in the above examples. These effects are however similar, regardless the use of a depolarizing layer or not.

In FIG. 6 the light paths in the rear part of a transflective LCD device is illustrated for the prior art case (portion 620) and for the case having a depolarizing means (portion 630). The rear part of this particular transflective LCD comprises a backlight 601, a linear polarizer 602, a retardation layer 603, and a transflector 605 confined on fop of the rear substrate 604. Portion 630 furthermore comprises a depolarizing means 606.

As shown, parts of the randomly polarized light that is emitted from the backlight 601 and that impinges the polarizer 602 is linearly polarized and transmitted by the polarizer 602. Thereafter the linearly polarized light impinges the retardation layer 603 where it is circularly polarized and transmitted towards the transflector 605. In display portion 620 the operation of a prior art display is illustrated. When impinging the transflector 605, a major part of the circularly polarized light is reflected with a reversed polarization direction back towards the retardation layer 603 where it is linearly polarized. The linearly polarized light impinging the polarizer 602 has a polarization direction that is perpendicular to the optical axis of the polarizer 602 and the polarizer 602 therefore absorbs the light. Thus, essentially all light reflected by the transflector 604 will be absorbed by polarizer 602 when propagating back towards the backlight 601, and is thereby wasted. Due to the absorption in the linear polarizer, light reflected by the transflector will not be recycled by the backlight 601 but will instead be wasted.

However, in display portion 630 a depolarizing means 606 is arranged in accordance with the invention. Light reflected at the transflector is thereby randomly polarized by the depolarizing means. Thus, randomly polarized light impinges the linear polarizer. Due to the absorbing properties, half of the impinging light is transmitted back towards the backlight and only half of the light is absorbed in the polarizer.

The inventive displays can be manufactured in much the same way as prior art displays, with only minor modifications in order to provide the depolarizing means.

The depolarizing means is typically a depolarizing layer that can be arranged in many different ways, e.g. directly on the transflector or separated from the transflector by one or more layers.

A transflective liquid crystal display device 700 according to one embodiment of the present invention will now be described, referring to FIG. 7. The liquid crystal display device 700 comprises a liquid crystal cell 710 comprising a front substrate 711 and a rear substrate 715, e.g. formed out of glass or the like, and a liquid crystal layer 712 sandwiched between the front and rear substrates 711, 715. A scattering layer 703, a compensation layer 702, and a polarizer 701 are sandwiched on top of the front substrate 711 in per se known manner. A transflector 713 is sandwiched on top of the rear substrate 715, and a twisted nematic polymer layer 704 and a backlight arrangement 705 are arranged underneath the back substrate 715. The twisted nematic polymer layer could alternatively be substituted by, for example, a linear polarizer and a quarter wave retarder in per se manner.

Moreover, according to this embodiment, depolarizing means in the form of a depolarizing layer 714 is applied between the transflector 713 and the rear substrate 715. The depolarizing means could however be placed anywhere between the transflector and the polarizing means 704. The transflector layer 713 could, for example, be formed out of Cr. The depolarizing layer 714 could preferably be etched in the same process as the transflector, in order to simplify the manufacturing process.

The backlight 705 typically comprises a diffusing film 706, a light guide 707, and optionally a reflector 708. The light guide is coupled to a light source, e.g. a light emitting diode (LED), typically arranged at the side of the display unit (not shown). In such a backlight arrangement 705, the returning light will either be caught in the light guide 707, reflected onto the reflector beneath the light guide, or scattered directly by the backlight diffuser film. The light that is reflected by the reflector propagates partly via the diffusing film to the rear stack and partly into the light guide. The light in the light guide is typically reflected several times in the light guide and is coupled out of the light guide via the diffusor. Thereby light reflected back from the transflector can be recycled and thus enhances the brightness and/or reduces the power consumption since the voltage applied to the light source can be reduced.

FIG. 8 illustrates another embodiment, similar to the embodiment illustrated in FIG. 7 but having the depolarizing means arranged between the rear substrate 715 and the polarizing means 704.

In the above designs, the polarizing means can be of a reflecting type, an absorbing type, or any intermediate type being partially reflecting and partially absorbing. For example, in addition to the examples given above, the polarizing means can comprise a reflective polarizer such as a "DBEF" (Dual Brightness Enhancement Film).

The general design and manufacturing of inventive displays correspond to a large degree with the design and manufacturing of prior art displays, and is therefore not described in excessive detail in this description. Basically, the differences between an inventive display and a prior art display are typically confined to the depolarizing means and the deposition thereof.

For example, referring to FIG. 9, small light scattering particles 902, e.g. small $SiO_x$ (Silicon Oxide) particles, deposited on the rear side of the transflector 904 can be used to depolarize the reflected light. The transflector used for this embodiment is preferably an in-cell diffusive metallic reflector of the hole-in-mirror type, comprising a roughened layer 903 to prevent specular reflections in the reflective mode, i.e. mirror images that may disturb the displayed image. The small particles 902 used for scattering and depolarizing the reflected parts of light are preferably dispersed into the roughened layer 903, on the rear side of the transflector 904 on top of the rear substrate 901. Similar arrangements with particles can however be utilized for depolarizers arranged outside the cell (i.e. on the backlight side of the rear substrate) as well.

Referring to FIG. 10, another embodiment of the present invention utilizes a separate white diffusive reflecting layer 1002 between the transflector 1003 and the rear substrate 1001. This separate layer is preferably deposited on the rear substrate before depositing the organic layers of the IDR. This can be achieved either by making an aperture in the diffuse reflective layer with the same mask step as used to open the organic IDR layer(s), or, if the organic layer is not opened, by an additional mask step for creating this aperture for transmitting the auxiliary light.

FIG. 11 is a table specifying theoretical recycling efficiencies for different cell concepts having a transflector with a transmission/reflection ratio of 25/75. A prior art display unit without depolarizing means is used for reference. As can be seen, only 12.5% of the input light is transmitted and as much as 87.5% is absorbed. Including a depolarizing means results in 19% of the light being recycled. In case a "DBEF" layer is used, 50% of the light is recycled before reaching the polarizer. Combining the use of a "DBEF" layer and a depolarizing means results in 69% of the light being recycled and only 18.5% being absorbed.

In per se manner, the inventive display can, of course be arranged with color filter in order to provide color displays, e.g. RGB (Red, Green, Blue) displays. The inclusion of such color filters can be made in any conventional manner.

The invention is applicable to displays wherein the liquid crystal layer, for example, is of a twisted nematic (TN) type, a super twisted nematic (STN) type, or a non-twisted nematic type.

It should however be noted that the above described embodiments of the present invention are not to be construed as limiting the invention, but are rather given as examples of how the present invention may be utilized. A man skilled in the art will be able to design many alternative embodiments of this invention, without departing from the spirit and scope of this invention, as defined by the appended claims.

The invention claimed is:

1. A transflective liquid crystal display device (700, 800) comprising: a liquid crystal layer (712), a transflector (713), a polarizing means (704), and a backlight (705), sandwiched in said order; said backlight (705) being operative to emit light towards said transflector (713), and said transflector (713) being transmissive for a first part of said light and non-transmissive for a second part of said light wherein said transflector (713) is of a hole-in-mirror type comprising at least one portion that is non-transmissive for light, and at least one portion that is transmissive for light; said display device (700, 800) further comprising a depolarizing means (714) arranged between said transflector (713) and said polarizing means (704); said depolarizing means (714) being operative to selectively depolarize said second part of light by randomly polarizing said second part of light, thereby enabling parts of said second part of light to be transmitted through said polarizing means (704) and to be recycled in said backlight (705).

2. A transflective liquid crystal display device (700, 800) according to claim 1, wherein said polarizing means (704) is an absorbing polarizing means.

3. A transflective liquid crystal display device (700, 800) according to claim 2, wherein said polarizing means (704) comprises a linear polarizer and circular polarizer.

4. A transflective liquid crystal display device (700, 800) according to claim 1, wherein said polarizing means (704) is a reflecting polarizing means.

5. A transflective liquid crystal display device (700, 800) according to claim 4, wherein said polarizing means (704) comprises a twisted nematic layer.

6. A transflective liquid crystal display device (700, 800) according to claim 1, wherein said depolarizing means (714) is arranged in direct contact with said transflector (713).

7. A transflective liquid crystal display device (700, 800) according to claim 6, wherein said depolarizing means (704) comprises a white, diffuse, depolarizing reflective layer (903) and light scattering particles (902) forming an integrated part of said reflective layer (903).

8. A transflective liquid crystal display device (700, 800) according to claim 1, wherein said liquid crystal layer (712) is of a twisted nematic type, a super twisted nematic type or a non-twisted nematic type.

9. A transflective liquid crystal display device, comprising:
a liquid crystal layer;
a transflector, wherein the transflector is of a hole-in-mirror type comprising at least one portion that is non-transmissive for light, and at least one portion that is transmissive for light;
a polarizing layer;
a depolarizing layer between the transflector and the polarizing layer,
a backlight emitting light towards the transflector,
wherein the transflector, depolarizing layer, polarizing layer and backlight are arranged in that order, wherein the transflector reflects a part of said light from the backlight towards the polarizing layer trough the depolarizing layer, and wherein the depolarizing layer randomly polarizes said part of the light before reaching the polarizing layer.

10. A transflective liquid crystal display device as in claim 9, wherein said polarizing layer is at least one of an absorbing polarizing layer and reflecting polarizing layer.

11. A transflective liquid crystal display device according to claim 10, wherein said polarizing means (704) comprises a linear polarizer and circular polarizer in the case of the absorbing polarizing layer, or a twisted nematic layer in the case of the reflecting polarizing layer.

12. A transflective liquid crystal display device according to claim 9, wherein said transflector comprises a portion that is non-transmissive to light, and a portion that is transmissive to light.

13. A transflective liquid crystal display device according to claim 12, wherein said depolarizing layer is arranged in direct contact with said transflector.

14. A transflective liquid crystal display device according to claim 13, wherein said depolarizing layer comprises light scattering particles dispersed on one surface of the transflector.

15. A transflective liquid crystal display device according to claim 14, wherein the light scattering particles are an integrated part of a depolarizing reflective layer, scattering and depolarizing said part of light reflected from the transflector.

16. A transflective liquid crystal display device according to claim 9, wherein said liquid crystal layer is at least one of a twisted nematic type, a super twisted nematic type and a non-twisted nematic type.

\* \* \* \* \*